United States Patent
Sato et al.

(10) Patent No.: US 11,073,905 B2
(45) Date of Patent: Jul. 27, 2021

(54) WORK ASSISTANCE SYSTEM, WORK ASSISTANCE METHOD, AND COMPUTER-READABLE RECORDING MEDIUM

(71) Applicant: FUJITSU LIMITED, Kawasaki (JP)

(72) Inventors: Teruyuki Sato, Tama (JP); Motonobu Mihara, Kawasaki (JP); Sébastien Picard, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 160 days.

(21) Appl. No.: 15/935,566

(22) Filed: Mar. 26, 2018

(65) Prior Publication Data

US 2018/0210548 A1 Jul. 26, 2018

Related U.S. Application Data

(63) Continuation of application No. PCT/JP2015/079473, filed on Oct. 19, 2015.

(51) Int. Cl.
*G06F 3/01* (2006.01)
*G06F 40/174* (2020.01)
(Continued)

(52) U.S. Cl.
CPC .......... *G06F 3/013* (2013.01); *G06F 3/0482* (2013.01); *G06F 3/04883* (2013.01);
(Continued)

(58) Field of Classification Search
CPC ........ G06F 3/013; G06F 9/453; G06F 40/174; G06F 3/0482; G06F 3/04883; G06Q 10/10; G06Q 40/00
See application file for complete search history.

(56) References Cited

U.S. PATENT DOCUMENTS

| 6,456,740 B1 * | 9/2002 | Carini ................. G06K 9/2054 178/18.01 |
| 2006/0256083 A1 * | 11/2006 | Rosenberg .............. G06F 3/013 345/156 |

(Continued)

FOREIGN PATENT DOCUMENTS

| JP | 2000-131599 | 5/2000 |
| JP | 2005-309633 | 11/2005 |

(Continued)

OTHER PUBLICATIONS

International Search Report dated Dec. 22, 2015 in corresponding International Patent Application No. PCT/JP2015/079473.

(Continued)

*Primary Examiner* — Andrew T Chiusano
(74) *Attorney, Agent, or Firm* — Staas & Halsey LLP (57) ABSTRACT

A work assistance system includes: a memory; and a processor coupled to the memory, wherein the processor executes a process including: displaying a data list in which pieces of data are arranged according to a predetermined rule, in a state being viewable by an operator; detecting a direction of a gaze movement of the operator with respect to the displayed data list; and changing a region to be highlighted in the data list, depending on whether the detected direction of the gaze movement is in a predetermined state.

9 Claims, 9 Drawing Sheets (51) Int. Cl.
- *G06F 3/0482* (2013.01)
- *G06Q 10/10* (2012.01)
- *G06F 3/0488* (2013.01)
- *G06Q 40/00* (2012.01)
- *G06F 9/451* (2018.01)

(52) U.S. Cl.
CPC ............ *G06F 9/453* (2018.02); *G06F 40/174* (2020.01); *G06Q 10/10* (2013.01); *G06Q 40/00* (2013.01)

(56) References Cited

U.S. PATENT DOCUMENTS

| | | | |
|---|---|---|---|
| 2009/0044091 A1* | 2/2009 | Gur | G06F 40/18 715/212 |
| 2012/0331506 A1 | 12/2012 | Arriola et al. | |
| 2015/0002394 A1* | 1/2015 | Oho | G02B 27/0093 345/156 |
| 2015/0316981 A1* | 11/2015 | Sellen | G06K 9/0061 345/156 |
| 2018/0004288 A1* | 1/2018 | Noda | G06F 3/0482 |

FOREIGN PATENT DOCUMENTS

| | | |
|---|---|---|
| JP | 2013-8369 | 1/2013 |
| JP | 2013-37399 | 2/2013 |
| JP | 2013-196158 | 9/2013 |
| JP | 2015-5056 | 1/2015 |
| JP | 2015-69787 | 4/2015 |

OTHER PUBLICATIONS

Written Opinion of the International Searching authority dated Dec. 22, 2015 in corresponding International Patent Application No. PCT/JP2015/079473.

* cited by examiner

| MANUFAC-TURER NAME (CODE) | PRODUCT (CODE) | | | | |
|---|---|---|---|---|---|
| | AIR CONDI-TIONER (10) | TELEVISION | | REFRIGER-ATOR (30) | ... |
| | | CRT-BASED (20) | LCD/PLASMA BASED (50) | | |
| AAA (001) | 1,404 YEN | 2,916 YEN | 2,916 YEN | 3,672 YEN | ... |
| AAB (002) | | | 2,916 YEN | | ... |
| AAC (003) | 1,404 YEN | | | | ... |
| AAD (004) | | | | 3,672 YEN | ... |
| ... | ... | ... | ... | ... | ... |
| BBB (101) | 1,620 YEN | | | | ... |
| BBC (102) | | 2,916 YEN | | | ... |
| BBD (103) | | 1,836 YEN | | | ... |
| ... | ... | ... | ... | ... | ... |

| MANUFAC-TURER NAME (CODE) | PRODUCT (CODE) | | | | |
|---|---|---|---|---|---|
| | AIR CONDI-TIONER (10) | TELEVISION | | REFRIGER-ATOR (30) | ... |
| | | CRT-BASED (20) | LCD/PLASMA BASED (50) | | |
| AAA (001) | 1,404 YEN | 2,916 YEN | 2,916 YEN | 3,672 YEN | ... |
| AAB (002) | | | 2,916 YEN | | ... |
| AAC (003) | 1,404 YEN | | | | ... |
| AAD (004) | | | | 3,672 YEN | ... |
| ... | ... | ... | ... | ... | ... |
| BBB (101) | 1,620 YEN | | | | ... |
| BBC (102) | | 2,916 YEN | | | ... |
| BBD (103) | | 1,836 YEN | | | ... |
| ... | ... | ... | ... | ... | ... |

| MANUFAC-TURER NAME (CODE) | PRODUCT (CODE) | | | | |
|---|---|---|---|---|---|
| | AIR CONDI-TIONER (10) | TELEVISION | | REFRIGER-ATOR (30) | ... |
| | | CRT-BASED (20) | LCD/PLASMA BASED (50) | | |
| AAA (001) | 1,404 YEN | 2,916 YEN | 2,916 YEN | 3,672 YEN | ... |
| AAB (002) | | | 2,916 YEN | | ... |
| AAC (003) | 1,404 YEN | | | | ... |
| AAD (004) | | | | 3,672 YEN | ... |
| ... | ... | ... | ... | ... | ... |
| BBB (101) | 1,620 YEN | | | | ... |
| BBC (102) | | 2,916 YEN | | | ... |
| BBD (103) | | 1,836 YEN | | | ... |
| ... | ... | ... | ... | ... | ... |

WORK ASSISTANCE SYSTEM, WORK ASSISTANCE METHOD, AND COMPUTER-READABLE RECORDING MEDIUM

CROSS-REFERENCE TO RELATED APPLICATION

This application is a continuation of International Application No. PCT/JP2015/079473, filed on Oct. 19, 2015, the entire contents of which are incorporated herein by reference.

FIELD

The embodiments discussed herein are related to a work assistance system, a work assistance method, and a computer-readable recording medium.

BACKGROUND

In government offices, banking facilities, and the like, for example, there is a case where a code number related to an application content or a code number for identifying a banking facility to be transferred into is entered in or input to a form. A user who enters the code numbers in the form refers to, for example, a code list and finds a code number corresponding to the entry content, to identify the code number.

Patent Literature 1: Japanese Laid-open Patent Publication No. 2005-309633

Patent Literature 2: Japanese Laid-open Patent Publication No. 2013-37399

However, even if the user is aware that he needs to enter a code number in the form, the user may feel confused as to how to find out the code number. At this time, for example, even if an example of descriptions in the form is displayed as a reference image and a reference image area is displayed for a content to be input to an entry column, it is difficult to assist the user to find out a desired code number from the code list.

In one aspect, an object of the present invention is to provide a work assistance system, a work assistance method, and a computer-readable recording medium that can assist a work of identifying desired data from a data list.

SUMMARY

According to an aspect of an embodiment, a work assistance system includes: a memory; and a processor coupled to the memory, wherein the processor executes a process including: displaying a data list in which pieces of data are arranged according to a predetermined rule, in a state being viewable by an operator; detecting a direction of a gaze movement of the operator with respect to the displayed data list; and changing a region to be highlighted in the data list, depending on whether the detected direction of the gaze movement is in a predetermined state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Disclosed techniques are not limited to the embodiments. Embodiments described below can be combined with one another as appropriate within a range of not causing any contradiction.

[a] First Embodiment

First, a case where a user has difficulty in filling in a form or the like is described. A first case is, for example, a case where it is difficult for a user to decide whether to enter personal information when he fills in a street survey, that is, the user feels awkward because he does not wish to answer. A second case is, for example, a case where a user has visited a store to send a parcel with a memo noting an address and a name, but has found that a phone number also needs to be filled in and then tries to remember the phone number, that is, the user feels awkward because he does not remember the phone number.

A third case is, for example, a case where the content to be written such as user's name is clear, but a user feels awkward because he does not know where to enter his name in the form. A fourth case is, for example, a case where a user does not know how to look up a code list at the time of entering a prefecture name by converting it to a code number, that is, the user feels awkward because he does not know how to fill in the form. In the fourth case, when the list is two or more dimensional, the user takes time until understanding how to look up the list, and thus it is effective to display a reference method to the list without any confusion about how to read the list as a guide.

Figure 1:
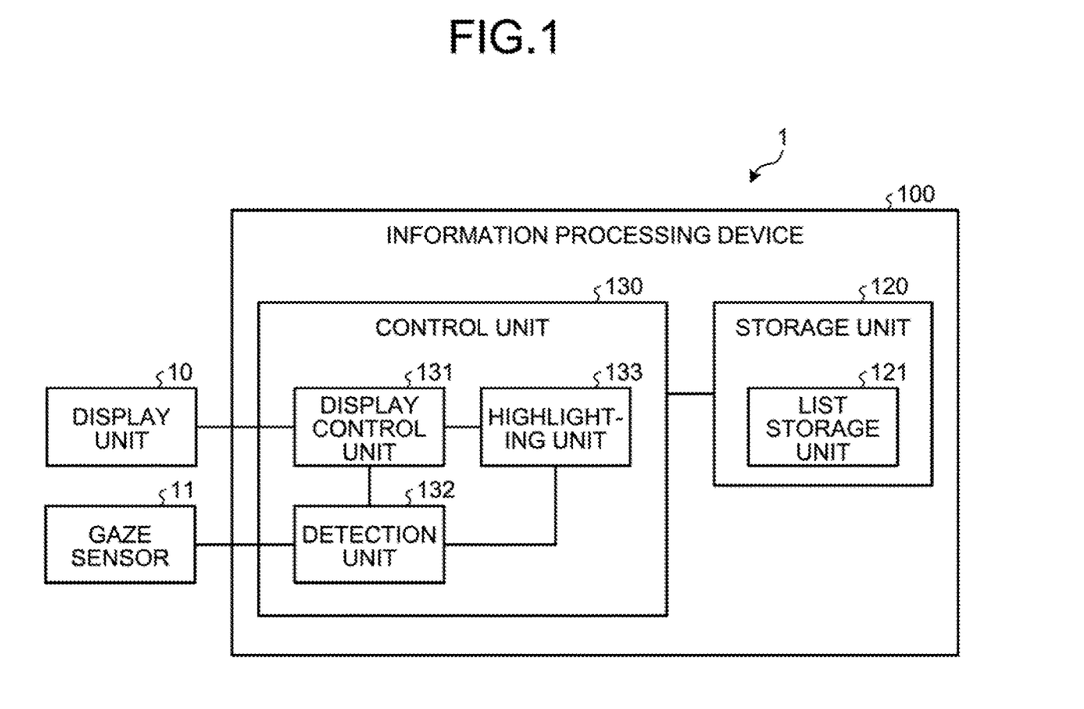
FIG. 1 is a block diagram illustrating an example of a configuration of a work assistance system according to a first embodiment.

FIG. 1 is a block diagram illustrating an example of a configuration of a work assistance system according to a first embodiment. A work assistance system 1 illustrated in FIG. 1 is a system that assists a user to refer to a list without feeling confused, with respect to the fourth case described above. That is, the work assistance system 1 is a system that assists a user to find a desired code number from a code list, for example, at the time of filling a code number in a form.

The work assistance system 1 illustrated in FIG. 1 includes a display unit 10 that displays a data list, which is a list of data to be referred to, for example, when a user, that is, an operator fills in a form on a writing table, a gaze sensor 11 for detecting a gaze of the user, and an information processing device 100. The information processing device 100 displays the data list in which pieces of data are arranged according to a predetermined rule, on the display unit 10 in a state being viewable by the operator. The information processing device 100 detects a direction of a gaze movement of the operator with respect to the data list displayed on the display unit 10, based on information obtained by the gaze sensor 11. The information processing device 100 changes a region to be highlighted in the data list, depending on whether the detected direction of the gaze movement is in a predetermined state. Accordingly, the work assistance system 1 can assist the work of identifying desired data from the data list.

The display unit 10 is a display device to display various pieces of information. The display unit 10 is realized, for example, by a projector or a liquid-crystal display as a display device. The display unit 10 displays various screens such as a reference screen input from the information processing device 100. The display unit 10 is, for example, a projector arranged at a position where the reference screen can be projected to a part of the writing table, or a liquid-crystal display incorporated in the writing table.

The gaze sensor 11 is a sensor that detects the gaze of a user who fills in a form on the writing table. The gaze sensor 11 is realized by, for example, an infrared ray camera. The gaze sensor 11 captures an image of pupil-cornea reflection light (Purkinje image) of the user, and outputs the captured image to the information processing device 100.

A configuration of the information processing device 100 is described next. As illustrated in FIG. 1, the information processing device 100 includes a storage unit 120 and a control unit 130. The information processing device 100 can include known various types of functional units included in a computer, for example, functional units such as various types of input devices and voice output devices, other than the functional units illustrated in FIG. 1.

The storage unit 120 is realized, for example, by a semiconductor memory device such as a RAM (Random Access Memory) or a flash memory, or a storage device such as a hard disk or an optical disk. The storage unit 120 includes a list storage unit 121. The storage unit 120 also stores therein information to be used for processing performed by the control unit 130.

Figure 2:
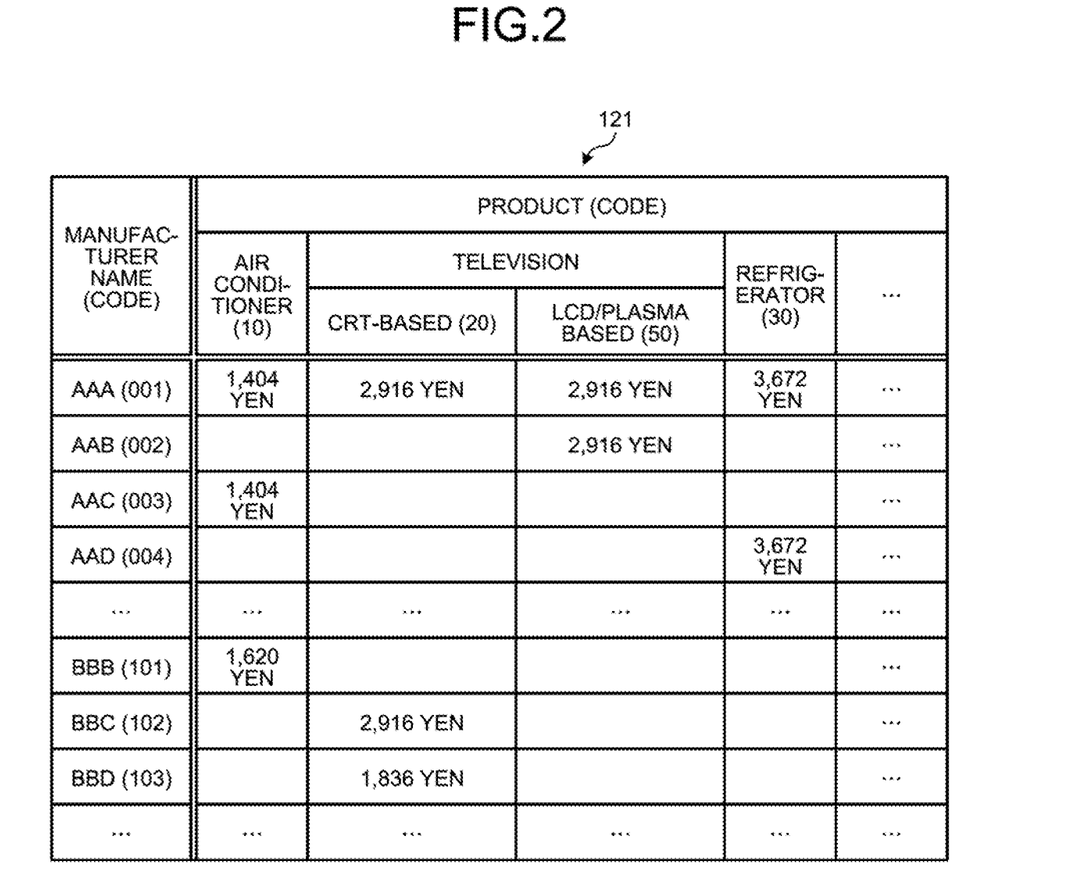
FIG. 2 is a diagram illustrating an example of a list storage unit.

The list storage unit 121 stores therein a list to be referred to. The list is a data list in which pieces of data are arranged according to a predetermined rule. FIG. 2 is a diagram illustrating an example of the list storage unit. The list illustrated in FIG. 2 is, for example, a list of recycling fees of recycling tickets of home electrical appliances. As illustrated in FIG. 2, the list storage unit 121 includes items of "manufacturer name (code)" and "product (code)".

The "manufacturer name (code)" is information indicating a manufacturer name of home electrical appliances and a code thereof. Further, the "manufacturer name (code)" corresponds to, for example, first key data in the data list. The "product (code)" is information indicating a product name of home electrical appliances to be recycled and a code thereof. The "product (code)" further includes items of "air conditioner (10)", "television", and "refrigerator (30)". The "television" further includes items of "CRT-based (20)" and "LCD/plasma based (50)". The "product (code)" corresponds to, for example, second key data in the data list. The first key data and the second key data can be set in a two-dimensional list, for example, such that data of one axis of a large list, which is desired to be referred to over a plurality of pages, is set as the first key data, and data of the other axis is set as the second key data. In the example of FIG. 2, it is indicated that, for example, the recycling fee of a product "refrigerator (30)" having a manufacturer name "AAA (001)" is "3,672 Yen".

Returning to the description of FIG. 1, the control unit 130 is realized, for example, by a CPU (Central Processing Unit) or an MPU (Micro Processing Unit) that executes a program stored in a storage device therein, using a RAM as a work area. Further, the control unit 130 can be realized by an integrated circuit, for example, an ASIC (Application Specific Integrated Circuit) or an FPGA (Field Programmable Gate Array). The control unit 130 includes a display control unit 131, a detection unit 132, and a highlighting unit 133, and realizes or performs functions and actions of information processing described below. The internal configuration of the control unit 130 is not limited to the configuration illustrated in FIG. 1, and other types of configurations can be employed as far as these are configurations in which information processing described later is performed.

When having detected that a form is placed on a writing table, for example, by a sensor (not illustrated), the display control unit 131 refers to the list storage unit 121 to display a reference screen including the data list on the display unit 10, and projects the reference screen on the writing table. That is, the display control unit 131 displays the data list in a state being viewable by a user, who is an operator.

The display control unit 131 displays a reference region guide on the data list of the reference screen. The reference region guide is a display or the like in which a manufacturer name on a vertical axis of the data list is enclosed by a frame. Further, when highlighting information is input from the highlighting unit 133, the display control unit 131 highlights the guide region according to the highlighting information. After having displayed the data list and the reference region guide, the display control unit 131 outputs guide region information and a detection start instruction to the detection unit 132. The display control unit 131 can output the guide region information and the detection start instruction to the detection unit 132 without displaying the reference region guide. In this case, the display of the reference region guide can be highlighted.

When the guide region information and the detection start instruction have been input from the display control unit 131, the detection unit 132 detects a gaze of a user based on a captured image input from the gaze sensor 11. That is, the detection unit 132 detects a direction of a gaze movement of the user with respect to the displayed list.

The detection unit 132 determines whether the direction of the gaze movement is along a direction of searching the guide region, in other words, a direction of the gaze movement different from the direction of searching the guide region has been detected, based on the guide region information, and the detected direction of the gaze movement. If a direction of the gaze movement different from the direction of searching the guide region has been detected, the detection unit 132 outputs the guide region information and a highlighting instruction to the highlighting unit 133. If the direction of the gaze movement different from the direction of searching the guide region has not been detected, the detection unit 132 continues detection of the user's gaze.

Upon input of the guide region information and the highlighting instruction from the detection unit 132, the highlighting unit 133 generates highlighting information indicating that the guide region in the guide region information is to be highlighted, and outputs the generated highlighting information to the display control unit 131. That is, the highlighting unit 133 changes a region to be highlighted in the data list depending on whether the direction of the gaze movement detected by the detection unit 132 is in a predetermined state. The highlighting is at least one display among a display in which luminance is increased, a display in which luminance is periodically changed, a display in which color is changed, and a display in which a thickness of a frame enclosing a region is changed, for example, as compared with other regions in the data list.

That is, if the direction of the gaze movement is in a first state, the highlighting unit 133 does not perform highlighting, and if the direction of the gaze movement is in a different state from the first state, the highlighting unit 133 highlights a specific region in the data list. The first state is a predetermined state and is a state where a direction of the gaze movement different from the direction of searching the guide region is not detected. That is, the first state is a state decided according to a predetermined rule followed by the data list. In other words, the first state indicates, for example, a case where the user's gaze position is moving downward in a region of the first key data in the data list. The predetermined rule followed by the data list is, for example, a rule in which the first key data is arranged on a vertical axis and the second key data is arranged on a horizontal axis.

If the display control unit 131 does not display the reference region guide, the highlighting unit 133 can display the reference region guide when the direction of the gaze movement is different from that of the first state. Further, even if the display control unit 131 displays the reference region guide, if the direction of the gaze movement is different from that of the first state, the highlighting unit 133 can output a new guide so that the reference region can be referred to by the user ahead of the gaze. The new guide is, for example, at least one display among a display in which a pop-up text is displayed, a display in which a text is scrolled so as to cross the gaze, and a display in which an arrow icon indicating a direction of leading the user's gaze to a predetermined gaze position is output.

Figure 3:
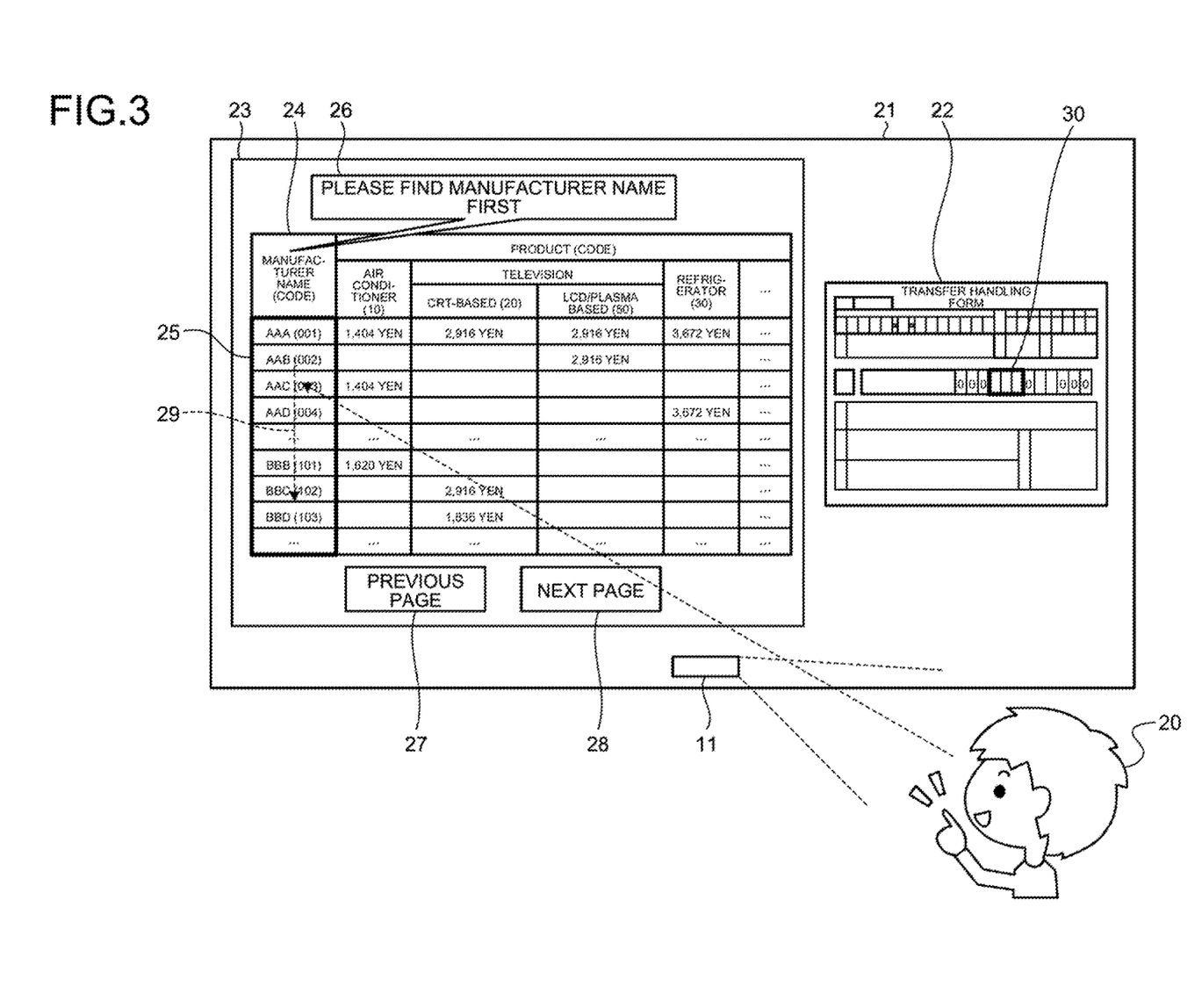
FIG. 3 is a diagram illustrating an example when referring to a data list at the time of filling in a form.

A specific example of the first embodiment is described with reference to FIG. 3 and FIG. 4. FIG. 3 is a diagram illustrating an example when referring to a data list at the time of filling in a form. As illustrated in FIG. 3, when a user 20 places a form 22 on a writing table 21, a reference screen 24 is displayed in a reference screen region 23 on the writing table 21. The gaze sensor 11 is provided on the writing table 21 to detect a gaze of the user 20. On the reference screen 24, a reference region guide 25 is displayed in a region of the first key data on the vertical axis indicating the manufacturer name, of the data list on the reference screen 24. Further, in a reference screen region 23, a guide 26 by characters, for example, "please find the manufacturer name first" is displayed. Also, in the reference screen region 23, a previous page button 27 and a next page button 28 for shifting the page are displayed when the data list is displayed over the plurality of reference screens 24. In the state illustrated in FIG. 3, the gaze of the user 20 moves sequentially from the top to the bottom in the region of the first key data, as indicated by an arrow 29. When having found the manufacturer name being the first key data, the user 20 reads a code of the found manufacturer name and enters the code in an entry column 30 of the form.

Figure 4:
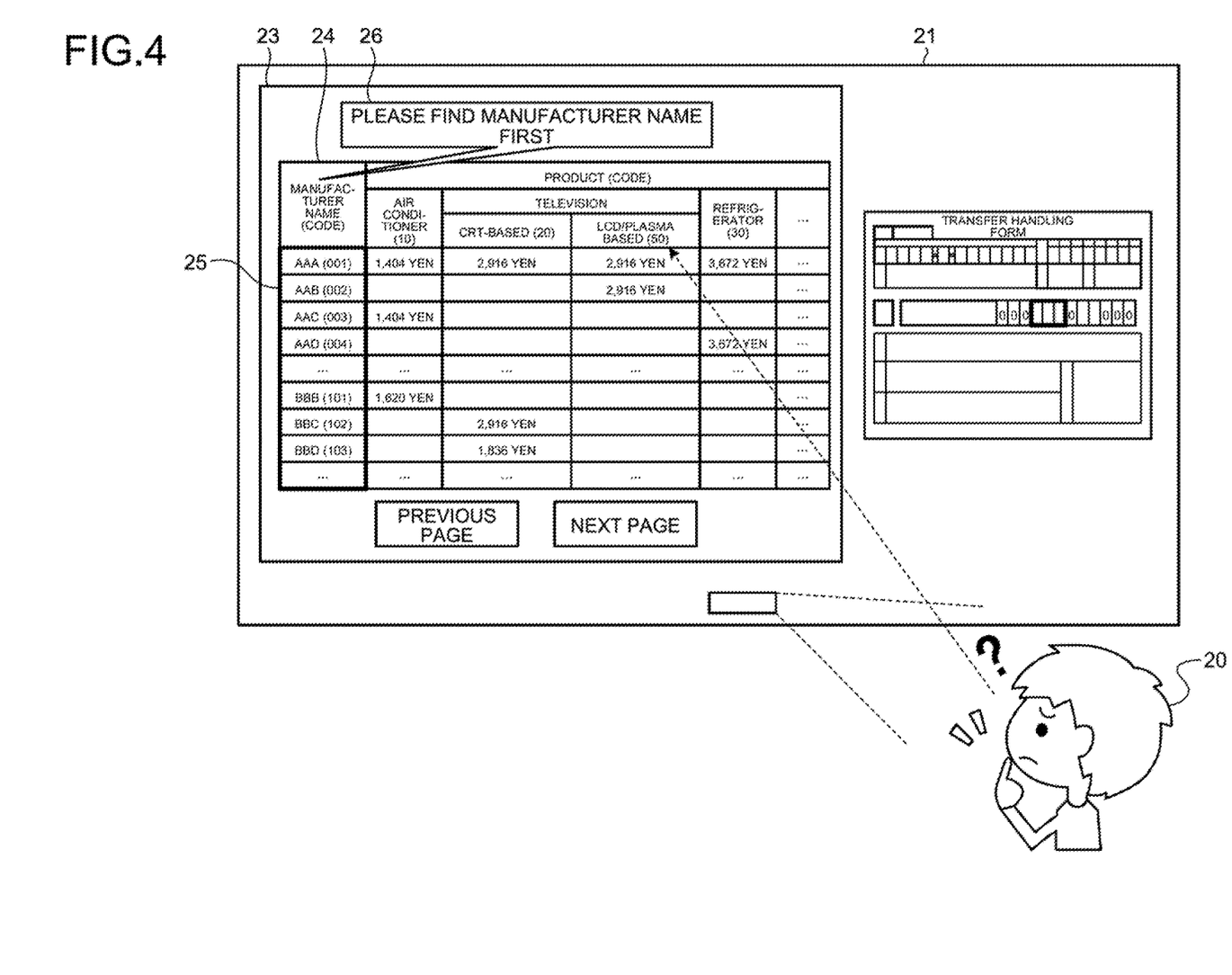
FIG. 4 is a diagram illustrating another example when referring to a data list at the time of filling in a form.

FIG. 4 is a diagram illustrating another example when referring to a data list at the time of filling in a form. In the state illustrated in FIG. 4, the gaze of the user 20 is outside the region of the first key data indicated by the reference region guide 25 and is located near the second key data of the horizontal axis in the data list. That is, the user 20 feels awkward because of not knowing where to refer to. In this case, the information processing device 100 blinks the region of the first key data on the vertical axis indicating, for example, the manufacturer name, the reference region guide 25, and the guide 26 to perform highlighting, thereby assisting the user 20. Alternatively, the information processing device 100 displays an arrow icon for leading the gaze in the direction of the reference region guide 25, to assist the user 20. Thus, the work assistance system 1 can assist the user to know where to refer to in the data list.

Further, in FIG. 3 and FIG. 4, when the gaze of the user 20 is in the region of the first key data, the reference region guide with respect to a cell near the gaze position is highlighted, and when the gaze of the user 20 is not in the region of the first key data, the reference region guide 25 including the entire region of the first key data being displayed can be highlighted. That is, the work assistance system 1 changes a region to be highlighted in the data list.

Figure 5:
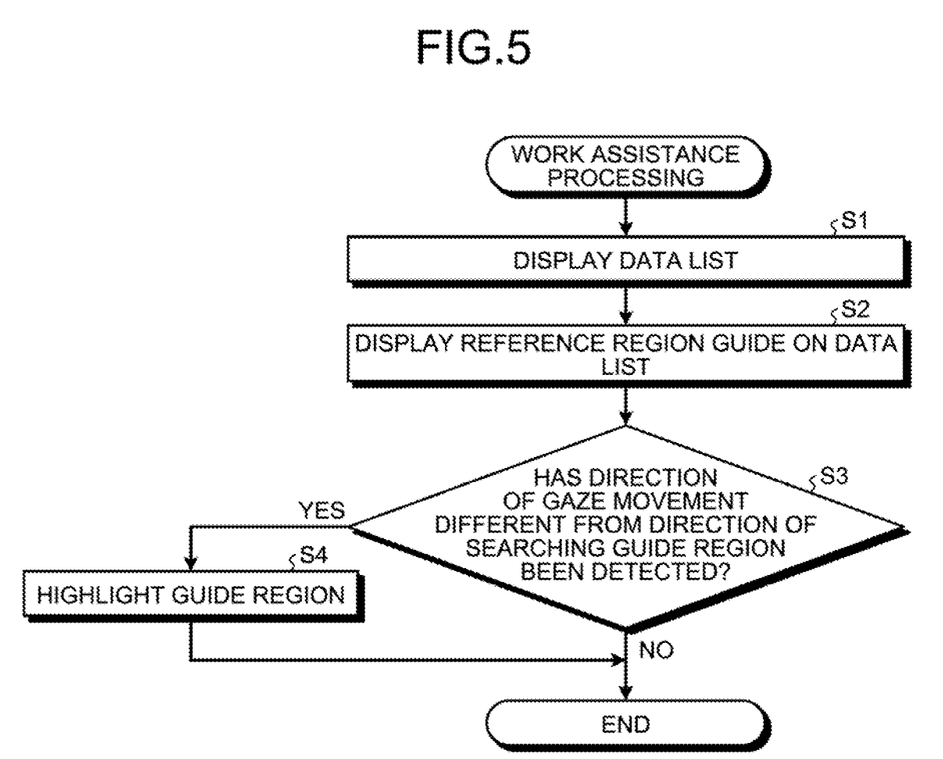
FIG. 5 is a flowchart illustrating an example of work assistance processing according to the first embodiment.

Next, an operation of the work assistance system 1 according to the first embodiment is described. FIG. 5 is a flowchart illustrating an example of work assistance processing according to the first embodiment.

When having detected that a form is placed on a writing table, for example, by a sensor (not illustrated), the display control unit 131 of the information processing device 100 displays a reference screen including a data list on the display unit 10 (writing table) (Step S1). The display control unit 131 displays a reference region guide on the data list on the reference screen (Step S2). After having displayed the data list and the reference region guide, the display control unit 131 outputs guide region information and a detection start instruction to the detection unit 132.

When the guide region information and the detection start instruction have been input from the display control unit 131, the detection unit 132 detects a gaze of a user based on a captured image input from the gaze sensor 11. The detection unit 132 determines whether a direction of the gaze movement different from a direction of searching the guide region has been detected, based on the guide region information, and the detected gaze position and movement (Step S3). If the direction of the gaze movement different from the direction of searching the guide region has been detected (YES at Step S3), the detection unit 132 outputs the guide region information and a highlighting instruction to the highlighting unit 133.

Upon input of the guide region information and the highlighting instruction from the detection unit 132, the highlighting unit 133 generates highlighting information indicating that the guide region in the guide region information is to be highlighted, and outputs the generated highlighting information to the display control unit 131. Upon input of the highlighting information from the highlighting unit 133, the display control unit 131 highlights the guide region according to the highlighting information (Step S4), to finish the processing when the user finishes referring to the data. If the direction of the gaze movement different from the direction of searching the guide region has not been detected (NO at Step S3), the detection unit 132 continues detection of the user's gaze and finishes the processing when the user finishes referring to the data. Accordingly, the work assistance system 1 can assist the work of identifying the desired data from the data list.

In this manner, the work assistance system 1 displays the data list in which pieces of data are arranged according to the predetermined rule in a state being viewable by an operator. Further, the work assistance system 1 detects a direction of a gaze movement of the operator with respect to the displayed data list. Further, the work assistance system 1 changes the region to be highlighted in the data list, depending on whether the detected direction is in the predetermined state. As a result, the work assistance system 1 can assist the work of identifying the desired data from the data list.

Further, when the direction of the gaze movement is in the first state, the work assistance system 1 does not perform highlighting, and when the direction of the gaze movement is in a state different from the first state, the work assistance system 1 highlights a specific region in the data list. As a result, only when the user's gaze is directed to a region other than the specific region to be referred to, the work assistance system 1 can remind the user of the specific region to be referred to.

Further, in the work assistance system 1, the first state is a state decided according to the predetermined rule followed by the data list. As a result, the work of identifying the desired data according to the data list can be assisted.

Further, in the work assistance system 1, the highlighting is at least one display among a display in which luminance is increased, a display in which luminance is periodically changed, a display in which color is changed, and a display in which a thickness of a frame enclosing a region is changed as compared with other regions in the data list. Further, the work assistance system 1 can output a new guide so that the reference region can be referred to by the user ahead of the user's gaze. The new guide is, for example, at least one display among a display in which a pop-up text is displayed, a display in which a text is scrolled so as to cross the gaze, and a display in which an arrow icon indicating a direction of leading the user's gaze to a predetermined gaze position is output. As a result, the user can find the specific region to be referred to.

Further, in the work assistance system 1, the operator's condition can be presented on other information processing devices and other information presentation screens located on a place where the system is installed (for example, a store), in synchronization with the highlighting to a state viewable by the operator. As a result, for example, a dedicated assistant can directly assist the user with the work.

[b] Second Embodiment

Figure 6:
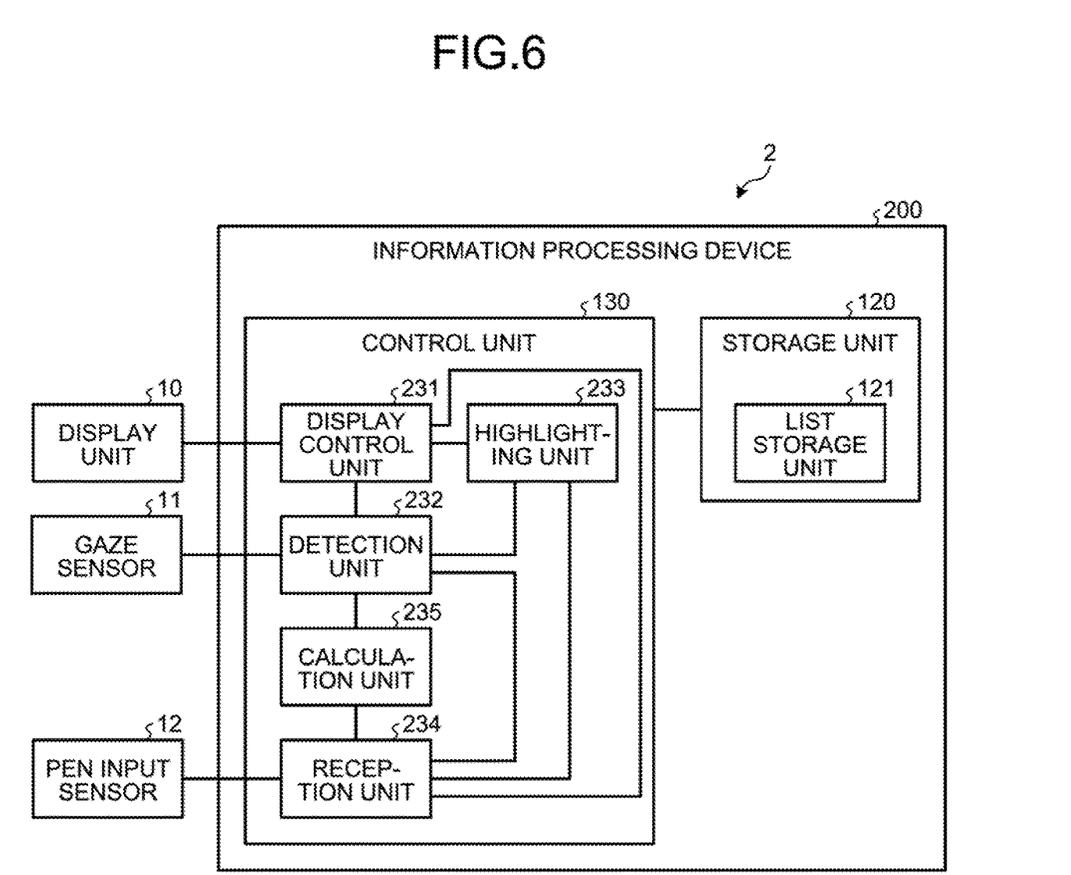
FIG. 6 is a block diagram illustrating an example of a configuration of a work assistance system according to a second embodiment.

In the first embodiment described above, a region in the data list is highlighted according to the user's gaze. However, a specific operation with respect to any data in the data list can be received. An embodiment in this case is described as a second embodiment. FIG. 6 is a block diagram illustrating an example of a configuration of a work assistance system according to the second embodiment. Constituent elements identical to those of the work assistance system 1 according to the first embodiment are denoted by like reference signs and redundant explanations of the constituent elements and operations are omitted.

A work assistance system 2 according to the second embodiment includes a pen input sensor 12 in addition to the units provided in the work assistance system 1 according to the first embodiment, to receive user's pen input operation.

The pen input sensor 12 is a sensor that detects a pen input by a user who fills in a form on a writing table. The pen input sensor 12 is realized, for example, by a digitizer installed on the writing table. An input range of the pen input sensor 12 is set, for example, to a range including a display range (a projection range) on a reference screen displayed by the display unit 10 on the writing table and a range in which entry to the form is performed. The pen input sensor 12 detects a pen point position to generate operation information based on the pen point position, and outputs the generated operation information to an information processing device 200. That is, the pen input sensor 12 detects the pen point position on the reference screen or on the form, generates the operation information based on the detected pen point position, and outputs the operation information to the information processing device 200.

The information processing device 200 of the work assistance system 2 includes a display control unit 231, a detection unit 232, and a highlighting unit 233 instead of the display control unit 131, the detection unit 132, and the highlighting unit 133 of the information processing device 100 according to the first embodiment. The information processing device 200 further includes a reception unit 234 and a calculation unit 235. In the following descriptions, features different from those of corresponding constituent elements according to the first embodiment are mainly explained and descriptions of identical functions are omitted.

When having detected that a form is placed on a writing table, for example, by a sensor (not illustrated), the display control unit 231 displays a message for prompting entry to a name or address entry column prior to the entry of a code number, on the display unit 10. The display control unit 231 detects that the form is placed on the writing table by capturing an image of a QR (Quick Response) code, for example, provided in the form by a camera (not illustrated). Further, the display control unit 231 outputs a gaze calibration instruction to the detection unit 232 and the reception unit 234.

When gaze calibration completion information is input from the detection unit 232, the display control unit 231 refers to the list storage unit 121 to display a reference screen including a data list on the display unit 10, and projects the reference screen on the writing table.

Similarly to the display control unit 131 according to the first embodiment, the display control unit 231 displays a reference region guide on the data list on the reference screen. The display control unit 231 displays the reference region guide, for example, on the first axis of the data list, that is, on a vertical axis. After having displayed the data list and the reference region guide, the display control unit 231 outputs guide region information and a detection start instruction to the detection unit 232. Further, when highlighting information or specific display information is input from the highlighting unit 233, the display control unit 231 highlights a guide region or specific data, according to the highlighting information or the specific display information. Further, when a change instruction is input from the detection unit 232, the display control unit 231 changes display of the reference region guide based on the change instruction.

When the gaze calibration instruction is input from the display control unit 231, the detection unit 232 outputs a detected gaze position to the calculation unit 235. The detection unit 232 corrects user's gaze position based on a captured image input from the gaze sensor 11 by using a correction value input from the calculation unit 235. That is, the detection unit 232 corrects the user's gaze position by using a fact that a pen point position of the user who is performing an entry operation matches the user's gaze position. When the pen point position of the user departs from the name or address entry column, the detection unit 232 completes correction of the user's gaze position, that is, gaze calibration. Upon completion of the gaze calibration, the detection unit 232 outputs gaze calibration completion information to the display control unit 231 and the reception unit 234.

When the guide region information and the detection start instruction are input from the display control unit 231, the detection unit 232 detects the user's gaze based on the captured image input from the gaze sensor 11. The detection unit 232 determines whether a direction of the gaze movement different from a direction of searching the guide region has been detected, based on the guide region information, and the position and the direction of the detected gaze point. If the direction of the gaze movement different from the direction of searching the guide region has been detected, the detection unit 232 outputs the guide region information and a highlighting instruction to the highlighting unit 233. If the direction of the gaze movement different from the direction of searching the guide region has not been detected, the detection unit 232 continues detection of the user's gaze.

Further, when specific information is input from the reception unit 234, the detection unit 232 changes the content of the first state, which is a determination criterion at the time of changing the region to be highlighted. That is, the detection unit 232 changes, for example, the first state corresponding to the region of the first key data on a vertical axis of the data list to a first state corresponding to the region of the second key data on a horizontal axis of the data list, because of the input of the specific information. That is, upon input of the specific information from the reception unit 234, the detection unit 232 changes the guide region in the guide region information to be output to the highlighting unit 233. That is, the guide region is changed, for example, from the region of the first key data on the vertical axis of the data list to the region of the second key data on the horizontal axis. Further, after having changed the guide region, the detection unit 232 outputs a change instruction of the guide region to the display control unit 231.

When the guide region information and the highlighting instruction are input from the detection unit 232, the highlighting unit 233 generates highlighting information indicating that the guide region in the guide region information is to be highlighted, and outputs the generated highlighting information to the display control unit 231. Further, when the specific information is input from the reception unit 234, the detection unit 232 generates specific display information indicating that, for example, highlighting is to be performed for the identified key data based on the specific information, and outputs the generated specific display information to the display control unit 231.

When the gaze calibration instruction is input from the display control unit 231, the reception unit 234 outputs operation information including the pen point position input from the pen input sensor 12 to the calculation unit 235. Further, upon input of the gaze calibration completion instruction from the detection unit 232, the reception unit 234 starts reception of a specific operation with respect to any one piece of data in the displayed data list, based on the operation information including the pen point position input from the pen input sensor 12. When having received the specific operation, the reception unit 234 outputs specific information identifying the data to the detection unit 232 and the highlighting unit 233.

When the gaze position is input from the detection unit 232 and the operation information is input from the reception unit 234, the calculation unit 235 calculates a correction value based on a difference between the gaze position and the pen point position in the operation information, and outputs the calculated correction value to the detection unit 232. That is, the calculation unit 235 calculates a correction value for detecting the gaze position of an individual user who is performing an entry operation, based on a relation between the pen point position on a screen and the gaze position while the entry operation to the name or address entry column is being performed.

Figure 7:
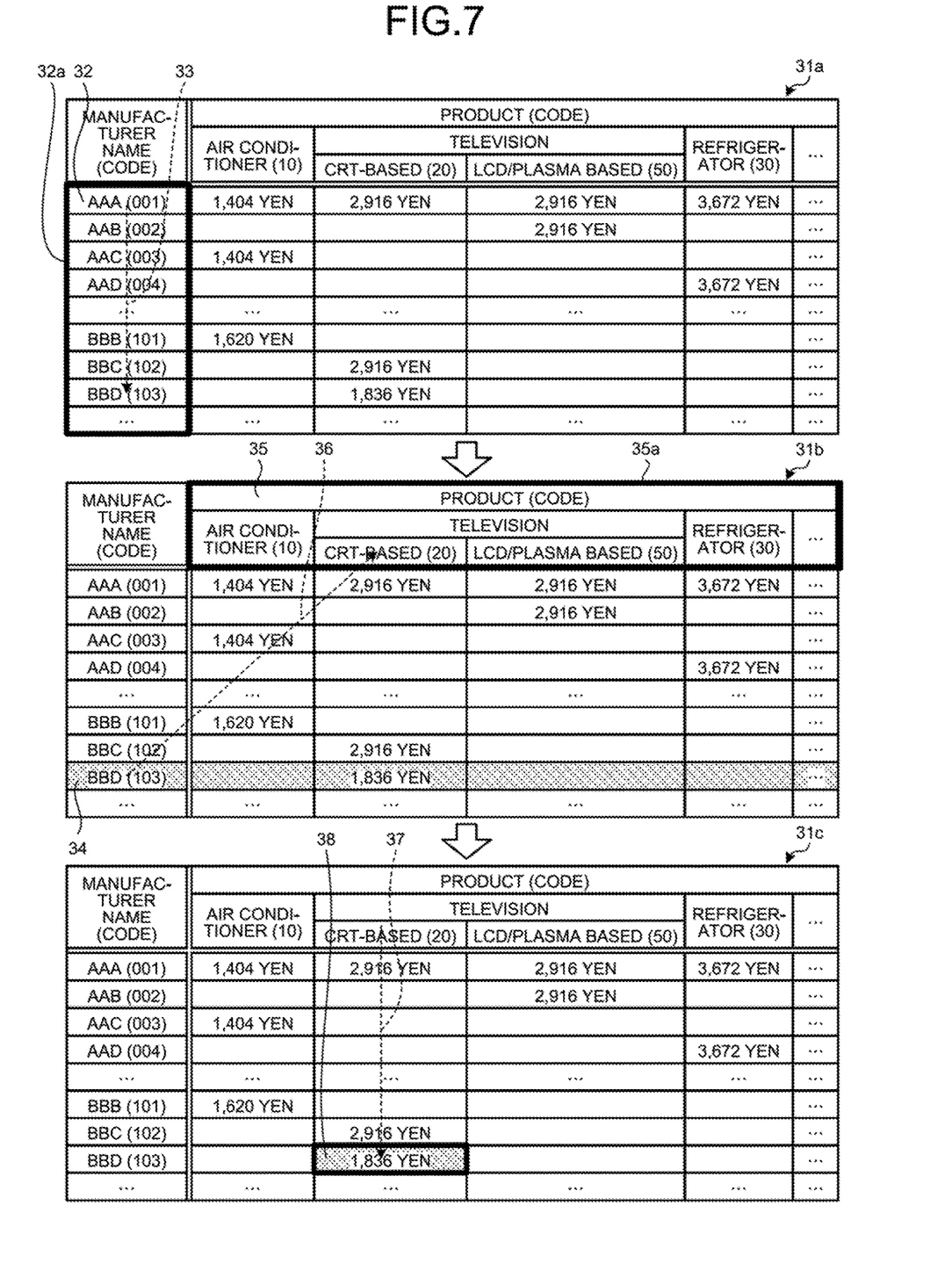
FIG. 7 is a diagram illustrating an example of a guide display and a direction of a gaze movement.

A specific example of the second embodiment is described with reference to FIG. 7. FIG. 7 is a diagram illustrating an example of a guide display and a direction of a gaze movement. In FIG. 7, descriptions are made by using reference screens 31a to 31c corresponding to the reference screen 24 on the writing table 21 in FIG. 3. In the following descriptions, an example is used in which a code and the fee of a product "television" of "CRT-based" under the name of manufacturer "BBD" are searched.

As illustrated in FIG. 7, in a reference screen 31a, a gaze of a user 20 moves sequentially from the top to the bottom in a region 32 of the first key data, as indicated by an arrow 33, in order to find the manufacturer name. At this time, a guide 32a is displayed in the region 32 of the first key data. When having found the manufacturer name "BBD" being the first key data, the user 20 reads a code "103" of the found manufacturer name and identifies the first key data by touching the manufacturer name "BBD" by a pen point. Further, the user 20 enters the read code "103" of the manufacturer name in a corresponding entry column of the form. At the time of searching the first key data, if the gaze of the user deviates from the region 32 of the first key data, the region 32 of the first key data is highlighted.

On the reference screen 31b, a row corresponding to the identified first key data 34 is, for example, highlighted. On the reference screen 31b, the gaze of the user 20 moves as indicated by an arrow 36 from the identified first key data 34 toward a region 35 of the second key data in order to search a product. At this time, a guide 35a is displayed in the region 35 of the second key data. The guide 35a is changed over from the guide 32a and displayed correspondingly to the identification of the first key data 34 by the user 20. When having found "CRT-based" of the product "television" being the second key data, the user 20 reads a code "20" of the found product, and touches "CRT-based" by the pen point to identify the second key data. Further, the user 20 enters the code "20" of the read product in a corresponding entry column of the form. At the time of searching the second key data, if the gaze of the user deviates from the region 35 of the second key data, the region 35 of the second key data is highlighted.

On a reference screen 31c, by identifying the first key data and the second key data on the reference screens 31a and 31b, a unique cell in the data list, that is, a column 38 of the recycling fee is highlighted. At this time, the gaze of the user 20 moves as indicated by an arrow 37. The user 20 reads the amount "1,836 Yen" in the column 38 of the recycling fee and enters the amount in a corresponding entry column of the form. Thus, the work assistance system 2 can assist a work of identifying desired data from the data list.

Figure 8:
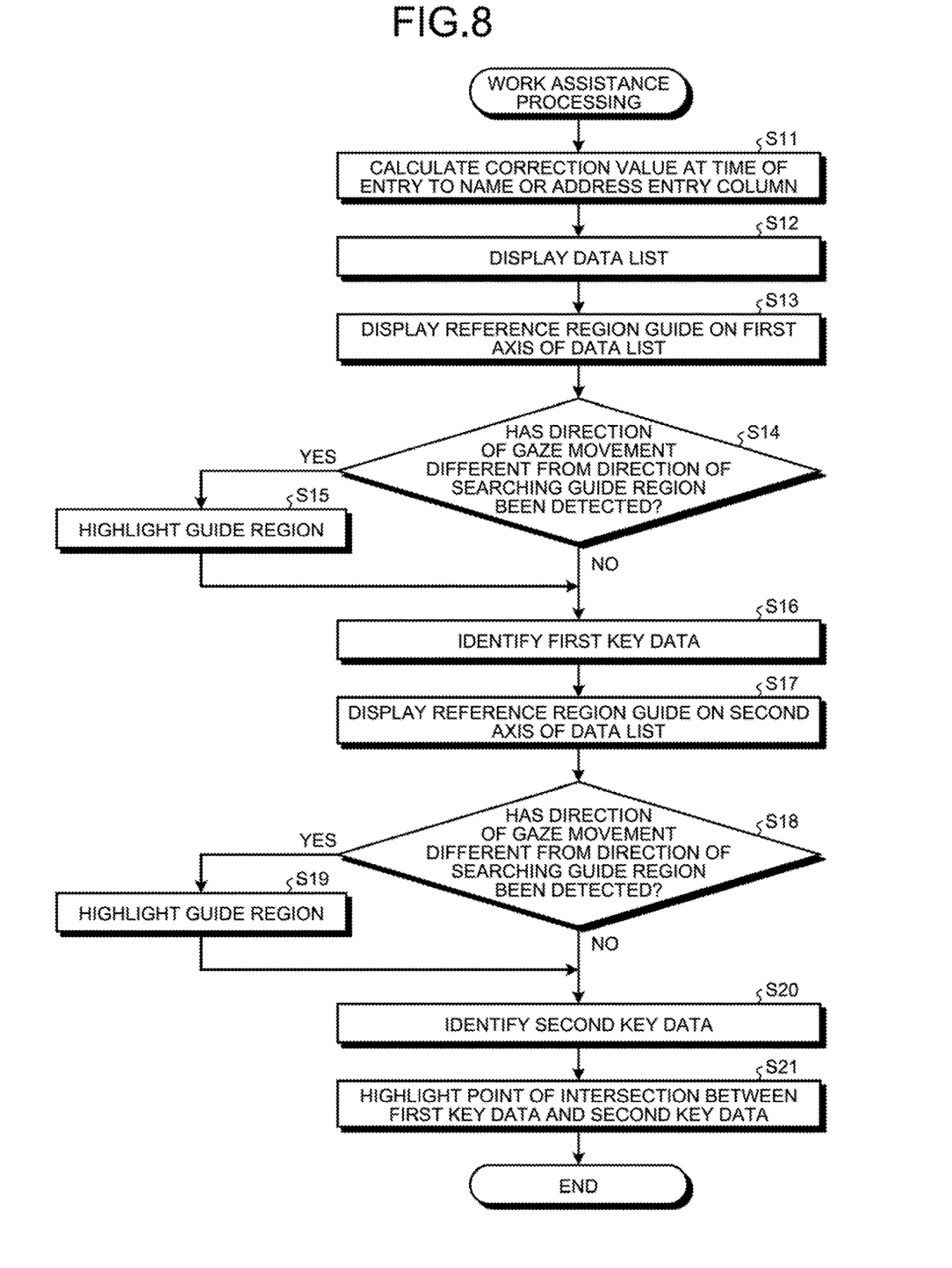
FIG. 8 is a flowchart illustrating an example of work assistance processing according to the second embodiment.

Next, the operation of the work assistance system 2 according to the second embodiment is described. FIG. 8 is a flowchart illustrating an example of work assistance processing according to the second embodiment.

When having detected that a form is placed on a writing table, for example, by a sensor (not illustrated), the display control unit 231 of the information processing device 200 displays a message for prompting entry to a name or address entry column on the display unit 10. The display control unit 231 also outputs a gaze calibration instruction to the detection unit 232 and the reception unit 234. Upon input of the gaze calibration instruction from the display control unit 231, the detection unit 232 outputs a detected gaze position to the calculation unit 235. Further, upon input of the gaze calibration instruction from the display control unit 231, the reception unit 234 outputs operation information including a pen point position input from the pen input sensor 12 to the calculation unit 235.

When the gaze position is input from the detection unit 232 and the operation information is input from the reception unit 234, the calculation unit 235 calculates a correction value based on a difference between the gaze position and the pen point position in the operation information (Step S11), and outputs the calculated correction value to the detection unit 232. The detection unit 232 corrects the user's gaze position based on a captured image input from the gaze sensor 11 by using the correction value input from the calculation unit 235. Upon completion of the gaze calibration, the detection unit 232 outputs gaze calibration completion information to the display control unit 231 and the reception unit 234.

Upon input of the gaze calibration completion instruction from the detection unit 232, the display control unit 231 displays a reference screen including a data list on the display unit 10 (writing table) (Step S12). The display control unit 231 displays a reference region guide on the first axis of the data list (Step S13). After displaying the data list and the reference region guide, the display control unit 231 outputs guide region information and a detection start instruction to the detection unit 232.

Upon input of the guide region information and the detection start instruction from the display control unit 231, the detection unit 232 detects a gaze of a user based on a captured image input from the gaze sensor 11. The detection unit 232 determines whether a direction of the gaze movement different from a direction of searching the guide region has been detected, based on the guide region information, and the position and the direction of the detected gaze point (Step S14). If the direction of the gaze movement different from the direction of searching the guide region has been detected (YES at Step S14), the detection unit 232 outputs the guide region information and a highlighting instruction to the highlighting unit 233.

Upon input of the guide region information and the highlighting instruction from the detection unit 232, the highlighting unit 233 generates highlighting information indicating that the guide region in the guide region information is to be highlighted, and outputs the generated highlighting information to the display control unit 231. Upon input of the highlighting information from the highlighting unit 233, the display control unit 231 highlights the guide region according to the highlighting information (Step S15). If the direction of the gaze movement different from the direction of searching the guide region has not been detected (NO at Step S14), the detection unit 232 continues detection of the user's gaze.

The reception unit 234 receives a specific operation for identifying the first key data based on the operation information including the pen point position input from the pen input sensor 12 (Step S16). Upon reception of the specific operation, the reception unit 234 outputs specific information identifying the first key data to the highlighting unit 233. Upon input of the specific information from the reception unit 234, the highlighting unit 233 generates specific display information for the identified first key data, and outputs the generated specific display information to the display control unit 231. Upon input of the specific display information from the highlighting unit 233, the display control unit 231 highlights the identified first key data correspondingly to the specific display information.

Further, upon input of the specific information from the reception unit 234, the detection unit 232 changes the first state to a first state corresponding to the region of the second key data. That is, the detection unit 232 changes the guide region to the region of the second key data. The detection unit 232 outputs a change instruction of the guide region to the display control unit 231. Upon input of the change instruction from the detection unit 232, the display control unit 231 displays a reference region guide on the second axis of the data list (Step S17).

The detection unit 232 determines whether the direction of the gaze movement different from the direction of searching the guide region has been detected (Step S18). If the direction of the gaze movement different from the direction of searching the guide region has been detected (YES at Step S18), the detection unit 232 outputs the guide region information and a highlighting instruction to the highlighting unit 233.

Upon input of the guide region information and the highlighting instruction from the detection unit 232, the highlighting unit 233 generates highlighting information indicating that the guide region in the guide region information is to be highlighted, and outputs the generated highlighting information to the display control unit 231. Upon input of the highlighting information from the highlighting unit 233, the display control unit 231 highlights the guide region according to the highlighting information (Step S19). If the direction of the gaze movement different from the direction of searching the guide region has not been detected (NO at Step S18), the detection unit 232 continues detection of the user's gaze.

The reception unit 234 receives a specific operation for identifying the second key data based on the operation information including the pen point position input from the pen input sensor 12 (Step S20). Upon reception of the specific operation, the reception unit 234 outputs specific information identifying the second key data to the highlighting unit 233. Upon input of the specific information from the reception unit 234, the highlighting unit 233 generates specific display information for the identified second key data, and outputs the generated specific display information to the display control unit 231. Upon input of the specific display information from the highlighting unit 233, the display control unit 231 highlights a column at a point of intersection of the identified first key data and second key data (Step S21), to finish the processing. Accordingly, the work assistance system 2 can assist the work of identifying the desired data from the data list.

Thus, the work assistance system 2 receives the specific operation with respect to any one piece of data in the displayed data list. Further, the work assistance system 2 changes the content of the first state, which is a determination criterion at the time of changing the region to be highlighted, correspondingly to the reception of the specific operation. As a result, because a guide is displayed in order of items of data for assistance, a work of identifying more desired data can be assisted.

Further, the work assistance system 2 prompts the operator to perform an entry operation to the name or address entry column and calculates a correction value for detecting the gaze position of the individual operator, based on a relation between the pen point position and the gaze position while the entry operation by the operator to the name or address entry column is being performed. Further, the work assistance system 2 detects a direction of the gaze movement of the operator with respect to the displayed data list by using the calculated correction value. As a result, the user's gaze position and the direction can be detected more accurately.

Further, in the work assistance system 2, the operator's condition can be presented on other information processing devices and information presentation screens on a place where the system has been installed (for example, stores), in synchronization with the highlighting to a state viewable by the operator. As a result, for example, a dedicated assistant can directly assist the user with the work.

In the respective embodiments described above, a two-dimensional list has been used as a data list to be referred to. However, the data list is not limited thereto. For example, the data list to be referred to can be a one-dimensional table such as a correspondence table between prefecture names and code numbers thereof, or a table of three-dimensions or more.

Further, in the respective embodiments described above, the data list to be referred to is one kind; however, the data list is not limited thereto. For example, when a plurality of code numbers are to be entered in a form, a code list corresponding to each of the code numbers can be displayed as the data list at the time of entering each of the code numbers.

Further, respective constituent elements of respective parts illustrated in the drawings do not always need to have physically the same configuration as illustrated in the drawings. That is, the specific mode of distribution and integration of the parts is not limited to the illustrated ones, and all or a part thereof can be configured to be functionally or physically distributed or integrated in an arbitrary unit, according to various kinds of load and the status of use. For example, the detection unit 232 and the reception unit 234 can be integrated with each other. Further, respective processes illustrated in the drawings are not always performed in the order described above. The processes can be performed simultaneously or can be performed while changing the order, within a range of not causing any contradiction in the contents of the processes.

Furthermore, all or an arbitrary part of each processing function executed by respective devices can be realized by a CPU (or a microcomputer such as an MPU and an MCU (Micro Controller Unit)). It is needless to mention that all or an arbitrary part of each processing function can be realized by a program analyzed and executed in the CPU (or a microcomputer such as an MPU and an MCU), or realized as hardware by a wired logic.

Figure 9:
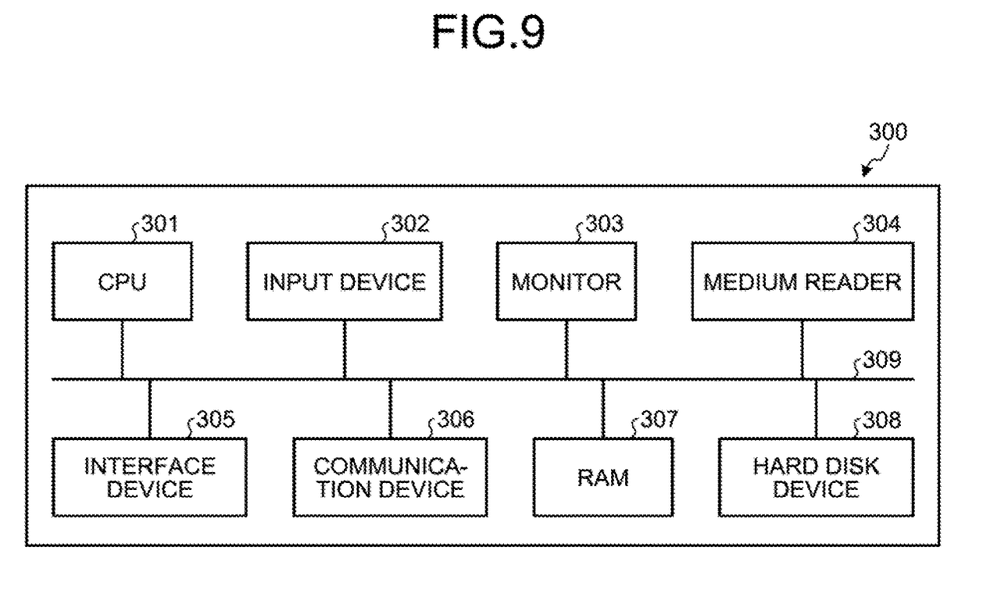
FIG. 9 is a diagram illustrating an example of a computer that executes a computer-readable recording medium.

Various processes explained in the embodiments described above can be achieved by executing a program prepared in advance by a computer. In the following descriptions, an example of a computer that executes a program having functions identical to those in the above embodiments is explained. FIG. 9 is a diagram illustrating an example of a computer that executes a computer-readable recording medium.

As illustrated in FIG. 9, a computer 300 includes a CPU 301 that performs various types of arithmetic processing, an input device 302 that receives data input, and a monitor 303. Further, the computer 300 includes a medium reader 304 that reads a program or the like from a storage medium, an interface device 305 for connection to various devices, and a communication device 306 for wired or wireless connection to other information processing devices or the like. The computer 300 also includes a RAM 307 for temporarily storing various pieces of information, and a hard disk device 308. The respective devices 301 to 308 are connected to a bus 309.

The hard disk device 308 stores therein a computer-readable recording medium having the same functions as those of the respective processing units of the display control unit 131, the detection unit 132, and the highlighting unit 133 illustrated in FIG. 1. Further, the hard disk device 308 can store therein a computer-readable recording medium having the same functions as those of the respective processing units of the display control unit 231, the detection unit 232, the highlighting unit 233, the reception unit 234, and the calculation unit 235 illustrated in FIG. 6. The hard disk device 308 also stores therein the list storage unit 121 and various pieces of data for realizing a computer-readable recording medium.

The input device 302 has, for example, the same functions as those of the pen input sensor 12 illustrated in FIG. 6 and receives input of various pieces of information such as the operation information from a user of the computer 300. The monitor 303 has, for example, the same functions as those of the display unit 10 illustrated in FIG. 1 and displays various screens such as the reference screen to the user. The interface device 305 is connected to, for example, the gaze sensor 11 illustrated in FIG. 1 or FIG. 6. The communication device 306 is connected to, for example, a network (not illustrated) to transmit and receive various pieces of information to and from other information processing devices.

The CPU 301 reads out the respective programs stored in the hard disk device 308 and executes the programs by developing the programs in the RAM 307, to perform various types of processing. These programs can cause the computer 300 to function as the display control unit 131, the detection unit 132, and the highlighting unit 133 illustrated in FIG. 1. Further, these programs can cause the computer 300 to function as the display control unit 231, the detection unit 232, the highlighting unit 233, the reception unit 234, and the calculation unit 235 illustrated in FIG. 6.

The computer-readable recording medium described above does not always need to be stored in the hard disk device 308. For example, the computer 300 can read a program stored in a storage medium readable by the computer 300 and execute the read program. A storage medium readable by the computer 300 corresponds to a portable recording medium such as a CD-ROM, a DVD disk, or a USB (Universal Serial Bus) memory, a semiconductor memory such as a flash memory, and a hard disk drive, for example. Further, the computer-readable recording medium can be stored in a device connected to a public circuit, the Internet, a LAN, or the like and the computer 300 can read the computer-readable recording medium therefrom to execute the computer-readable recording medium.

It is possible to assist a work of identifying desired data from a data list.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A work assistance system comprising:
a memory; and
a processor coupled to the memory, wherein the processor executes a process comprising:
displaying a data list in which a first region, a second region and a third region are arranged, first pieces of data, second pieces of data and third pieces of data being respectively arranged therein, wherein any one piece of data among the third pieces of data is specified by one of the first pieces of data and one of the second pieces of data, so that the data list is viewable by an operator;
displaying in the displayed data list a region guide that indicates the first region in which the operator is supposed to search for one of the first pieces of data;
obtaining a detected gaze position of the operator and a direction of a gaze movement of the operator with respect to the displayed data list;
highlighting the first region in the data list, when the detected direction of the gaze movement does not include the first region,
receiving from the operator a specific operation that specifies one piece of data among the first pieces of data in the displayed data list,
displaying in the displayed data list a region guide that indicates the second region in which the operator is supposed to search for one of the second pieces of data, and
highlighting the second region in the data list, when the detected direction of the gaze movement does not include the second region.

2. The work assistance system according to claim 1, wherein the highlighting is at least one display among a display in which luminance is increased, a display in which luminance is periodically changed, a display in which color is changed, and a display in which a thickness of a frame enclosing the first region is changed, as compared with other regions in the data list.

3. The work assistance system according to claim 1, the process further comprising:
prompting the operator to perform an entry operation to a name or address entry column with a stylus,
obtaining a detected pointing position of the stylus using a pen input sensor,
and calculating a correction value for correcting a gaze position of the operator with respect to the displayed data list based on a relation between the detected pointing position of the stylus and a detected entry gaze position of the operator while the entry operation to the name or address entry column is being performed by the operator,
wherein in the obtaining of the detected gaze position, the direction of the gaze movement of the operator with respect to the displayed data list is detected by using the calculated correction value.

4. A work assistance method comprising:
displaying a data list in which a first region, a second region and a third region are arranged, first pieces of data, second pieces of data and third pieces of data being respectively arranged therein, wherein any one piece of data among the third pieces of data is specified by one of the first pieces of data and one of the second pieces of data, so that the data list is viewable by an operator, using a processor;
displaying in the displayed data list a region guide that indicates the first region in which the operator is supposed to search for one of the first pieces of data, using the processor;
obtaining a detected gaze position of the operator and a direction of a gaze movement of the operator with respect to the displayed data list, using the processor; and
highlighting the first region in the displayed data list, when the detected direction of the gaze movement does not include the first region, using the processor;
receiving from the operator a specific operation that specifies one piece of data among the first pieces of data in the displayed data list, using the processor;
displaying in the displayed data list a region guide that indicates the second region in which the operator is supposed to search for one of the second pieces of data, using the processor; and
highlighting the second region in the displayed data list, when the detected direction of the gaze movement does not include the second region, using the processor.

5. The work assistance method according to claim 4, wherein the highlighting is at least one display among a display in which luminance is increased, a display in which luminance is periodically changed, a display in which color is changed, and a display in which a thickness of a frame enclosing the first region is changed, as compared with other regions in the data list.

6. The work assistance method according to claim 4, further comprising:
prompting the operator to perform an entry operation to a name or address entry column with a stylus,
detecting a pointing position of the stylus using a pen input sensor, and
calculating a correction value for correcting a gaze position of the operator with respect to the displayed data list based on a relation between the detected pointing position of the stylus and a detected entry gaze position of the operator while the entry operation to the name or address entry column is being performed by the operator, using the processor,
wherein in the obtaining of the detected gaze position, the direction of the gaze movement of the operator with respect to the displayed data list is detected by using the calculated correction value.

7. A non-transitory computer-readable recording medium having stored therein a program that causes a computer to execute a method comprising:
displaying a data list in which a first region, a second region and a third region are arranged, first pieces of data, second pieces of data and third pieces of data being respectively arranged therein, wherein any one piece of data among the third pieces of data is specified by one of the first pieces of data and one of the second pieces of data, so that the data list is viewable by an operator;
displaying in the displayed data list a region guide that indicates the first region in which the operator is supposed to search for one of the first pieces of data;
obtaining a detected gaze position of the operator and a direction of a gaze movement of the operator with respect to the displayed data list;
highlighting the first region in the data list, when the detected direction of the gaze movement does not include the first region;

receiving from the operator a specific operation that specifies one piece of data among the first pieces of data in the displayed data list;

displaying in the displayed data list a region guide that indicates the second region in which the operator is supposed to search for one of the second pieces of data; and highlighting the second region in the data list, when the detected direction of the gaze movement does not include the second region.

8. The non-transitory computer-readable recording medium according to claim 7, wherein the highlighting is at least one display among a display in which luminance is increased, a display in which luminance is periodically changed, a display in which color is changed, and a display in which a thickness of a frame enclosing the first region is changed, as compared with other regions in the data list.

9. The non-transitory computer-readable recording medium according to claim 7, wherein the program causes the computer to further execute:

prompting the operator to perform an entry operation to a name or address entry column with a stylus, detecting a pointing position of the stylus using a pen input sensor, and calculating a correction value for correcting a gaze position of the operator with respect to the displayed data list based on a relation between the detected pointing position of the stylus and a detected entry gaze position of the operator while the entry operation to the name or address entry column is being performed by the operator, wherein in the obtaining of the detected gaze position, the direction of the gaze movement of the operator with respect to the displayed data list is detected by using the calculated correction value.

\* \* \* \* \*